Figure 1:
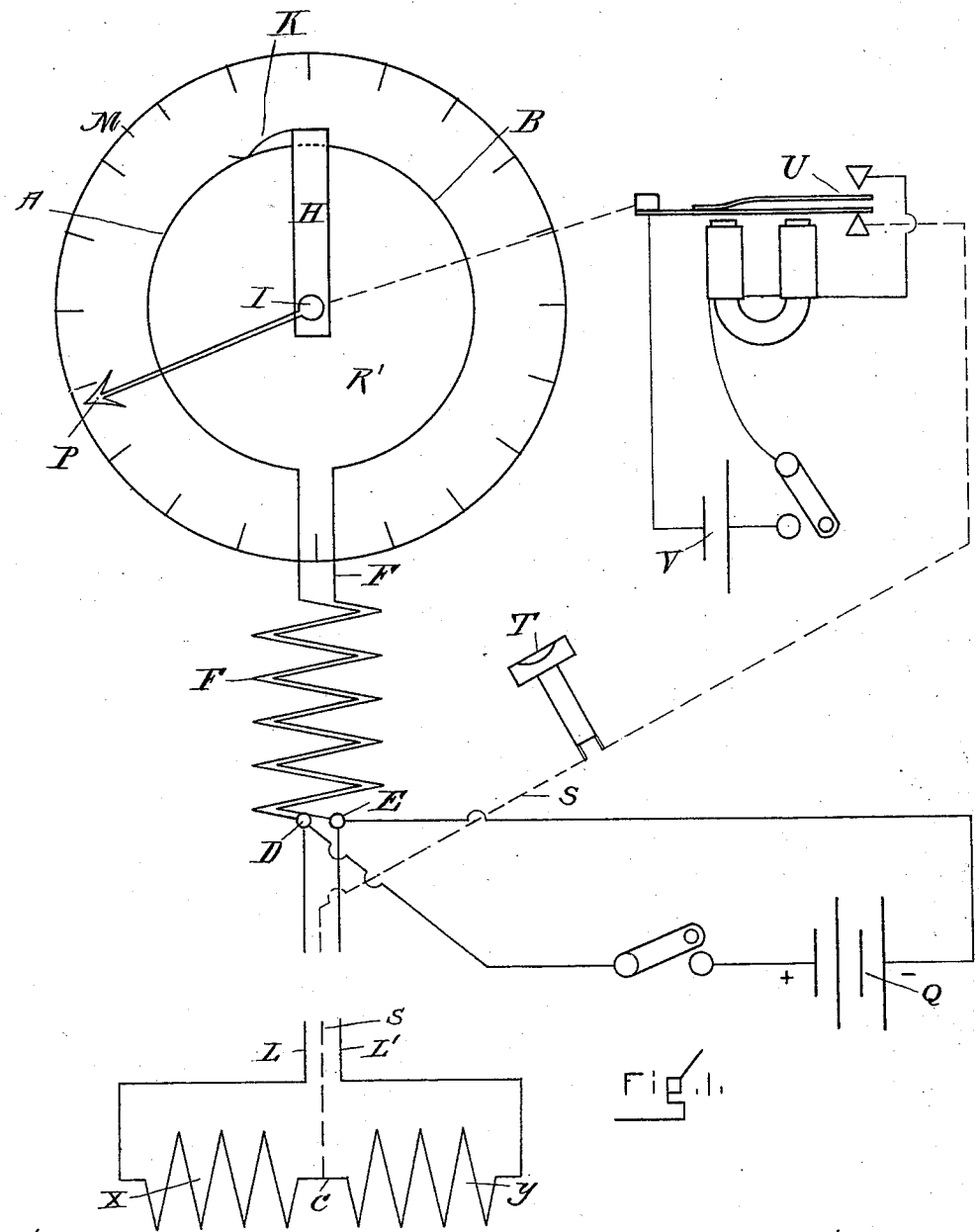

(No Model.) 2 Sheets—Sheet 1.

G. C. WHIPPLE & H. E. WARREN.
ELECTRICAL THERMOMETER.

No. 540,008. Patented May 28, 1895.

WITNESSES
Alfred J. Burrow
Thomas J. Cunningham

INVENTORS.
George C. Whipple
Henry E. Warren (No Model.) 2 Sheets—Sheet 2.
G. C. WHIPPLE & H. E. WARREN.
ELECTRICAL THERMOMETER.
No. 540,008. Patented May 28, 1895.
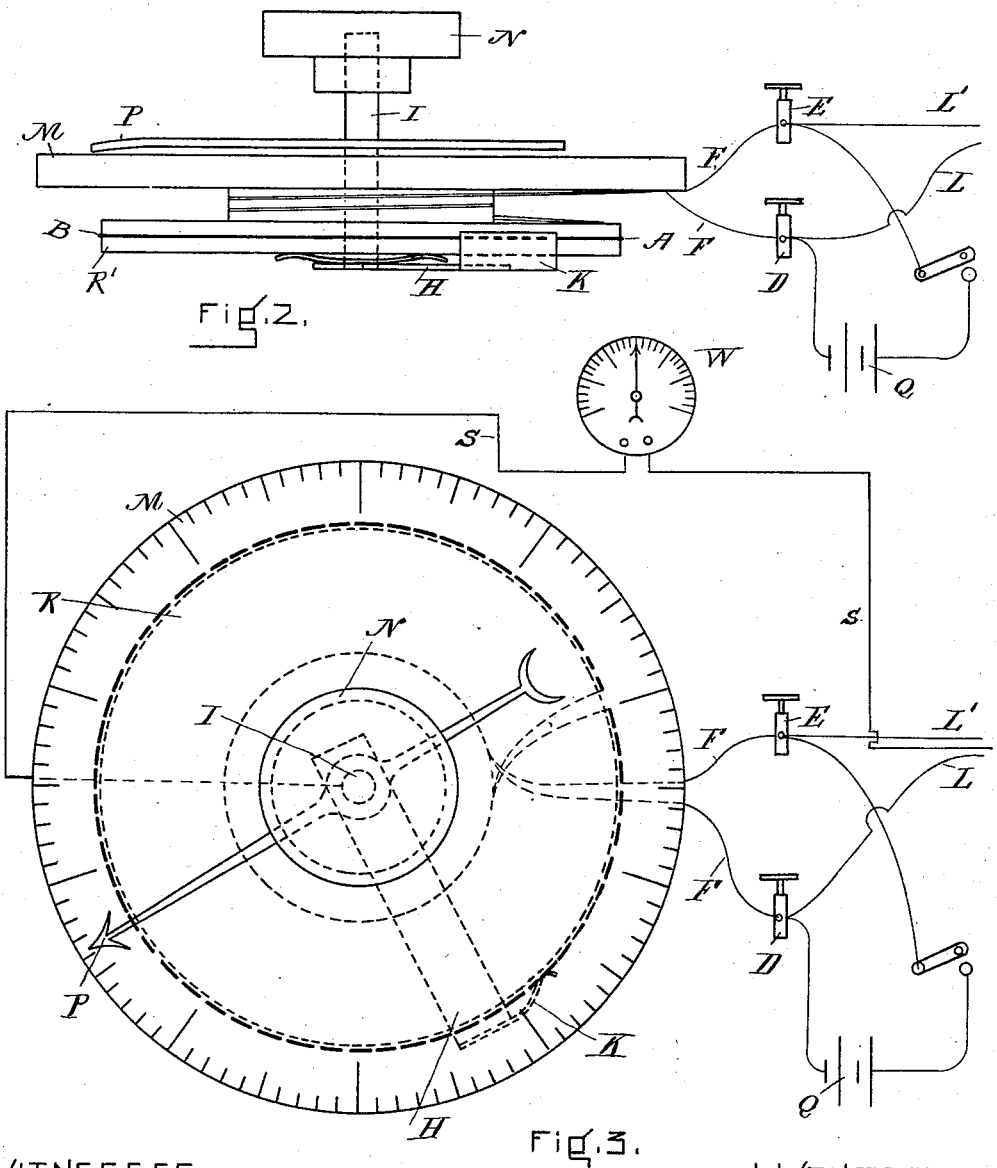
WITNESSES
Alfred J. Burrows
Thomas J. Cunningham
INVENTORS.
George C. Whipple
Henry E. Warren

UNITED STATES PATENT OFFICE.

GEORGE C. WHIPPLE AND HENRY E. WARREN, OF NEWTON, MASSACHUSETTS.

ELECTRICAL THERMOMETER.

SPECIFICATION forming part of Letters Patent No. 540,008, dated May 28, 1895.

Application filed December 5, 1894. Serial No. 530,868. (No model.)

*To all whom it may concern:*

Be it known that we, GEORGE C. WHIPPLE and HENRY E. WARREN, of Newton, in the county of Middlesex and Commonwealth of Massachusetts, have invented certain Improvements in Electrical Thermometers, of which the following is a specification.

Our invention relates to that class of thermometers by which the temperature at a distant or temporarily inaccessible place may be indicated or ascertained at a convenient place of observation by means of the electrical connection of the portions of the apparatus located at the respective places. Electrical methods and apparatus for this purpose are of two classes, namely, varying resistance and thermal junction.

Our invention belongs to the first mentioned class, in which heretofore the apparatus used has been defective or subject to great disadvantage in practical use, for the reason that it showed, not the absolute temperature at the distant point, but rather the difference between the temperature at that point and a temperature which might be conveniently determined at the place of observation, for instance, that of melting ice. The chief reasons which have prevented the commercial use of these prior devices are, the expense of the apparatus, which has been cumbersome as well as requiring a sensitive galvanometer; the necessity of employing a skilled electrician to set up the apparatus and make computations therefrom when used; the long time required for this, and also the expense of the leading or line wires which must be made large to give low resistance.

By our improved apparatus and method we believe that the above mentioned difficulties and objections have been overcome.

Our invention consists of two electric conductors of different materials which have different known temperature coefficients of electrical resistance and are to be located at a distant or temporarily inaccessible point. These two materials constitute electrical resistances, and we ascertain the different resistance ratios between them by properly connecting them with a device for measuring ratios of resistance, such for instance as that commonly known as the Wheatstone bridge, or a differential galvanometer as a part of the indicating portion of our apparatus; and when using a Wheatstone bridge a telephone with some current varying device may be employed instead of a galvanometer. These electrical resistances of different materials, may be conveniently in the form of coils and for brevity we will hereinafter designate them as "temperature coils," and the device by which the ratios of resistances between these two coils, produced by different temperatures, are measured, we will designate as the "ratio-measurer."

The manner of determining the temperature at a distant or temporarily inaccessible location is as follows: The temperature coils are placed near together at that location and electrically connected with the ratio-measurer, and a battery or other source of electrical supply. Then any ratio of resistance between the two temperature coils which may exist at a given time can be readily determined by the location of the movable part of the ratio-measurer upon a scale graduated to indicate ratios of resistances between the two temperature coils, for the various degrees of temperature within a desired range, which have been previously determined.

In the drawings accompanying this specification we have illustrated specific forms of devices, which may be used to make up our improved apparatus, wherein—

Figure 1 is a diagrammatic view of all the devices connected for use, with a telephone and interrupter for indicating the presence of electric current. Fig. 2 is an elevation of the device for measuring ratios of resistance; and Fig. 3 is a plan view of the same, showing a pointer and graduated scale, and a galvanometer for the current-indicating device.

Referring to the drawings, X and Y are two temperature coils of different metals, for instance X, of copper and Y of German silver. C is the electrical conductor joining the two coils by one extremity, and L, L', are the leading or line wires which connect the other extremities of said coils respectively with the two terminals D, E, of the said ratio-measurer R, which is a modification of what is commonly known as the Wheatstone slide-wire bridge, and consists of a hard rubber or other nonconducting disk R', around the periphery of which the wire F, is secured. A movable arm H, is pivoted at I, in the center of the disk, R'. To the outer end of the arm H a spring contact slide K is attached, and this is arranged so as to bear upon the wire around the periphery of the disk R'. Above the disk R', and concentric therewith on the pivot I, is a circular card M, graduated around its edge to indicate degrees or fractions of degrees of temperature which correspond to the ratios of resistances which will be produced in the temperature coils by the various temperatures indicated. Above this card is a pointer P secured to the pivot I, and upon the upper end of the pivot is a knurled wheel N by which the arm H and pointer P may be turned. Electric current is supplied by a battery Q, its two poles being respectively connected to the terminals D, E, of the ratio-measurer.

At the junction of the two resistance coils X, Y, (Fig. 1) one end of a line S is connected and the other with the sliding contact K of the ratio-measurer, and this line has in circuit a telephone T and an interrupting apparatus U provided with a separate battery V. This interrupter is employed to cause distinct indications in the telephone of the presence of current in the line S. In Fig. 3 a galvanometer W is shown in the line S, in place of a telephone and interrupter, to indicate the flow of current through the line.

Instead of using the interrupter U, the portion of the wire F around the disk R', with which the slide K comes in contact may be roughened so that whenever K, is moved over any part of the wire it will produce a rapid interruption of the contact or variation of current which will be readily heard in the telephone if there is any current passing over the line S; or any suitable current varying device which will cause a vibration of the telephone diaphragm may be used in place of the interrupter. We have also found that by using a small magneto generator in place of the main battery Q, the presence of a current in the line S will be indicated in the telephone, by reason of the variation in the strength of the current from the main circuit, without an interrupter. The connections of the battery Q and the line S may be interchanged, that is, the battery may be connected at C and I, and the line S connected at D and E and have the apparatus operate properly.

Where it is desired to determine temperatures below 400° Fahrenheit copper and German silver will be found advantageous materials to use in the respective temperature coils, because of the cheapness of those metals, their permanence, and wide difference in temperature coefficients of electrical resistances. German silver is especially adapted for one of these coils, because of its low electrical temperature coefficient and high specific resistance. These differences in the temperature coefficients of electrical resistance between these two metals are expressed according to the formula following: $r_t = r_0 (1 + at + bt^2 + Ct^3 +)$. Where $r_0$ represents the resistance at 0° of temperature and $r_t$ the resistance at $t°$ of temperature and for copper, $a = +0.003824$ and $b = +0.00000126$ and for German silver, $a = +0.000443$ and $b = +0.00000015$.

Among the metals which may be used in place of copper, are gold, aluminium or iron for low temperatures and platinum for high temperatures, and alloys of various metals, for instance, what is known as platinoid may be used, in place of German silver. Gold and aluminium have the commercial disadvantage of large expense and iron the practical one of liability to corrode.

Platinum alloyed with iridium will be found advantageous for use instead of German silver when high temperatures are to be determined, or carbon may be used.

Although the galvanometer ordinarily would serve only to indicate the presence or absence of an electric current in the line S and thus aid in adjusting the pointer of the ratio-measurer, it may be used however, to indicate absolute temperatures, by first fixing the sliding contact at a given position and then by practical trial properly graduating the scale of the galvanometer to indicate degrees of temperature. Then any change in the ratio of resistance between the two temperature coils, caused by a change in temperature at that point, will be automatically indicated by the galvanometer needle on its scale at each moment. Such an arrangement of a galvanometer would be of especial benefit in very accurate temperature measurements. By using a registering galvanometer, of the kind which throws a ray of light upon a slowly moving sensitized sheet, and graduating this sheet to indicate degrees of temperature the variations of temperature at the temperature coils through a period of time may be accurately and automatically registered.

In the construction of our improved apparatus to be used out of doors, to determine the temperature of water at various depths—for instance; for the temperature coils—we have generally used cotton or silk covered wire, placed within small metal or glass tubes to serve as a protection. When using a small brass tube, the whole may be placed in compact form by coiling into a helix, and this resistance coil may be further protected against corrosion and pressure by filling the spaces around the wire within the tube with oil, or other insulating substance which may be easily introduced, thus furnishing a covering for the wire, through which changes in temperature are readily and quickly transmitted.

We have found that a resistance of about one hundred ohms for each coil is satisfactory for use with a telephone, although we have had no difficulty in using coils having a resistance of one thousand ohms or even more. It will be found convenient to make the resistance of the two temperature coils equal at a temperature about the middle of the range of degrees which the apparatus is intended to be used for determining.

The resistance allowable in the two leading or line wires L, L', should depend upon the resistance of the temperature coils; the variations of temperature to which the leading wires are liable to be subjected; the range of temperature readings which are to be made and the precision desired.

When the range of temperature readings desired is 100° and when both leading wires are of copper and liable to be subjected to variations of 90° Fahrenheit, the resistance of each of those wires may be as great as two per centum of either of the temperature coils and give accurate results, with one-tenth of a degree Fahrenheit as a maximum error while for ordinary commercial work when the range of temperature readings desired is 50° and the leading wires are of copper and liable to be subjected to variations of temperature of 50°, the resistance of each of these wires may be as great as twenty per centum of either of the temperature coils and give accurate results with one-half of a degree Fahrenheit as the maximum error; but to obtain these results the two leading wires must be kept at the same average temperature, which may be readily accomplished by twisting them together, and for convenience the wire leading to the ratio-measurer through the telephone or galvanometer may also be twisted with the other leading wires. The amount of resistance of the conductor leading to the telephone, with relation to the temperature coils is not material however.

Referring to Fig. 1, the operation of the apparatus will be readily understood. From the battery Q, the current from the positive pole passes to the terminal D where it divides, a portion passing over the conductor L, through the resistances X, Y, in series, and back over the conductor L' to E and thence to the negative pole of the battery. The other portion of the current passes from D around the disk R' over the two portions A, B, of the conductor F, to the terminal E, and back to the negative pole of the battery. When the temperature at the location of the coils X, Y, is such as to make the resistance in them equal, the adjustment of the sliding contact K upon the wire F, to produce a balance, should be arranged so that the pointer P preferably will be at about the middle part of the scale M.

The apparatus illustrated in the drawings is in principle of operation, substantially like that of Wheatstone's bridge, the coils X, Y, forming two arms thereof, and the portions A, B, of the wire F, forming the other two arms. When the two sides of this bridge are in balance, no current will flow from the battery over the said line S. As soon however as the temperature at the coils X, Y, changes, the ratio of resistance in those coils becomes different by reason of the respective metals of which they are composed having different temperature coefficients of electrical resistance, as heretofore explained. This change in the ratio of resistance will cause a difference in the potential of the electric current at the two ends of the line S, and cause a current to flow over that line, which will be indicated in the telephone or by the galvanometer. The potential between the two ends of the line S may then be equalized by moving the sliding contact K in one direction or the other around the disk R' until the telephone or galvanometer indicates that no current is passing over the said line. The mark where the pointer P then rests will indicate the temperature at the temperature coils X, Y, for the reason as above set forth that the scale M has been graduated to indicate the temperatures at which the various ratios of resistances are produced in the said temperature coils.

To express the relation of the ratios of resistances in the several parts of the apparatus in algebraic terms, when the current indicating device indicates a neutral electrical condition:—$\frac{X}{Y}=\frac{A}{B}$; but as X and Y vary with the temperature and A and B by the slide K, $\frac{A}{B}$ must be varied as $\frac{X}{Y}$ varies with the temperature; but $\frac{X}{Y}$ is a function of the absolute temperature at X, Y, and therefore $\frac{A}{B}$ is the same function of the absolute temperature at the location X, Y. In our apparatus the ratio $\frac{A}{B}$ can be directly read from the graduated card; but we have found it better to make the scale divisions such a function of $\frac{A}{B}$ that the absolute temperature of X, Y, is indicated thereon.

In the above algebraic expressions the resistances of the leading wires L, L', have not been represented for the reason that if L, L', were subject to no changes of temperature the amount of resistance in those wires would be wholly immaterial so far as the accuracy in determining temperatures is concerned, and even the changes in resistance due to changes in temperature in those wires which do take place are slight, and as the changes occur on opposite sides of the bridge at the same time, and to substantially the same amount, in our apparatus, such changes in resistance cause little error in its indications.

We have found that with our instrument when using a commercial telephone as the current indicating instrument, accurate readings may be obtained too .05° Fahrenheit.

We claim—

1. An apparatus for determining temperatures electrically, consisting of two conducting materials having different temperature coefficients of electrical resistance and which are to be placed at the point where temperature is to be determined, and a device for measuring the ratios of resistances produced by temperature changes in said materials, electrically connected therewith, and to be located at a place of observation.

2. An apparatus for determining temperatures consisting of two materials which have different temperature coefficients of electrical resistance, and a device for measuring the ratios of resistances between said materials electrically connected therewith, and an electrical generator to supply current to said apparatus for the purpose described.

3. An apparatus for determining temperatures consisting of two electrical conductors which are joined by one extremity and have different temperature coefficients of electrical resistance, a device for measuring resistance ratios between said conductors, electrically connected therewith, a source of electrical supply therefor and a current indicating device in an independent line electrically connected with said conductors and the ratio-measurer substantially as described.

4. An apparatus for indicating temperatures at distant or inaccessible locations consisting of a pair of resistance coils joined at one of their extremities, and which have different temperature coefficients of electrical resistance, a device for measuring resistance ratios between said coils, electrically connected therewith, an independent line electrically connecting the junction of said coils and said ratio measuring device, which has a telephone and a current varying device in circuit, for the purpose specified.

5. In an apparatus for determining temperatures electrically a pair of resistances, which are constant in mass, but whose ratios of electrical resistances are different at each degree of temperature, and a device for measuring said ratios consisting of an electric conductor connected with said resistances and a movable contact upon said conductor which is electrically connected with the junction of said resistances, through a current indicating device substantially as described.

6. In an apparatus for determining temperatures at distant or inaccessible locations, two materials which have different temperature coefficients of electrical resistance, joined together in proximity to serve as electrical resistances at the distant point, and a Wheatstone slide-wire bridge provided with a source of electrical supply and a current indicating device electrically connected with said materials.

7. In an apparatus for determining temperatures electrically a pair of electrical conductors which have different temperature coefficients of electrical resistance, and are joined together in proximity, a device for measuring ratios of resistance between said conductors, electrically connected therewith, a source of electrical supply, an adjustable contact on said ratio-measurer independently connected with said conductors, and a scale in juxtaposition to said adjustable contact to indicate degrees of temperature corresponding to the different ratios of resistance which each temperature will produce in said conductors.

GEORGE C. WHIPPLE.
HENRY E. WARREN.

Witnesses:
ALFRED J. BURROW,
THOMAS J. CUNNINGHAM.